United States Patent [19]

Huntsberger

[11] 4,130,677

[45] Dec. 19, 1978

[54] PROCESS FOR APPLYING TO GLASS AN ORGANIC COATING HAVING CONTROLLED BOND STRENGTH

[75] Inventor: James R. Huntsberger, Wilmington, Del.

[73] Assignee: E. I. Du Pont de Nemours and Company, Wilmington, Del.

[21] Appl. No.: 844,519

[22] Filed: Oct. 21, 1977

[51] Int. Cl.$^2$ .......................... B05D 1/36; B05D 1/38
[52] U.S. Cl. .................................. 427/379; 427/387; 427/407 A
[58] Field of Search ..................... 427/379, 387, 407 A

[56] References Cited

U.S. PATENT DOCUMENTS

| | | |
|---|---|---|
| 3,415,673 | 12/1968 | Clock ........................... 427/385 R X |
| 3,661,628 | 5/1972 | Marsden ........................ 428/391 X |
| 3,922,450 | 11/1975 | Stengle ......................... 427/385 R X |
| 4,056,208 | 11/1977 | Prejean ......................... 427/387 X |

Primary Examiner—James R. Hoffman

[57] ABSTRACT

A glass surface is first coated with very thin layers of γ-aminopropyltriethoxysilane and low molecular weight polyethylene, which may be applied separately or simultaneously. A coating of a copolymer of an α-olefin with an α,β-unsaturated carboxylic acid is then applied to the precoated glass surface and heated to form a uniform film, which is capable of delaminating from glass and containing cullet upon impact resulting in glass breakage. This process if of special interest in coating the outer surfaces of glass containers to protect persons or property from injury or damage.

12 Claims, No Drawings

PROCESS FOR APPLYING TO GLASS AN ORGANIC COATING HAVING CONTROLLED BOND STRENGTH

BACKGROUND OF THE INVENTION

This invention relates to a new organic coating for glass surfaces, especially for non-returnable glass bottles and other glass containers, which protects the glass from scratching, thus increasing its breakage resistance, and also is capable of retaining glass fragments when a glass container is accidentally broken.

Accidental breakage of glass containers, especially bottles containing a carbonated or fermented liquid under gas pressure, can cause serious injury to persons and occasionally to property. Breakage is sometimes caused by imperfections in glass or by scratches and abrasion resulting from normal handling. Various types of coatings have been applied to glass containers to reduce the risk of breakage. It is customary in the glass container industry to apply to pristine containers molecular layers of titanium or tin oxides; often this is followed by a very thin organic coating, for example, of polyethylene or of polyoxyethylene stearate, at a temperature of about 93°–204° C. While these and similar forms of glass treatment have reduced the risk of breakage by strengthening the glass itself, they have not solved the problem of damage and injury in case of accidental breakage, especially in the case of pressurized containers.

Two approaches have been recently taken with respect to this particular problem. One, which applies to non-returnable containers, consists in coating the container with a thin layer of an organic, preferably polymeric material, which forms a film capable of retaining glass fragments after breakage. This coating must adhere to the glass sufficiently strongly to remain attached to it during normal filling and handling operations. Yet, the bond must not be so strong that the organic coating would not be able to delaminate on impact that causes breakage. It is this ability to delaminate that allows the coating to act as a protective shield because a major portion of impact energy is dissipated by viscoelastic deformation of the organic film, which is able to stretch without breaking.

The other approach, that applies to returnable bottles, also requires an organic coating, which in this case is considerably thicker and must be strongly bonded to glass. Such a coating must be able to withstand repeated alkaline washing, which of course is not required in the case of non-returnable glass containers.

Prior art has suggested the use of thermoplastic copolymers of $\alpha$-olefins with $\alpha,\beta$-unsaturated short chain carboxylic acids as a particularly suitable material for coating both returnable and non-returnable glass containers. The basic patent covering the copolymers themselves is U.S. Pat. No. 3,264,272 to Rees. Various improvements in those coating processes have been proposed, including an invention directed to non-returnable glass containers described in U.S. Pat. No. 3,992,450 to Stengle. This patent provides a layer of polyethylene between the glass and the copolymer. The main advantage of the patented invention is said to reside in the compatibility of the coating with the primary protective organic coating applied to the pristine container at the factory.

While the process of U.S. Pat. No. 3,992,450 provides an excellent protective system, it has the drawback that the bond strength between the polyethylene coating and the glass decreases sharply at high humidity; for example, above 80% relative humidity (R.H.) bonding is very weak, and above 85% R.H. virtually no bonding remains. There thus is a need for a protective coating for non-returnable glass containers capable of absorbing the impact of breakage and of retaining the resulting cullet, which would operate satisfactorily within a broad range of humidities, including high R.H. levels.

SUMMARY OF THE INVENTION

According to the present invention, there is now provided a process for applying to glass a coating capable of delamination and stretching upon impact resulting in glass breakage, said process comprising: (1) applying to a glass surface free from materials which are non-dispersible in water a two-component coating which contains as one component $\gamma$-aminopropyltriethoxysilane that bonds directly to the glass, and as the other component polyethylene having an average molecular weight within the range of approximately 1000 to 2000 in an amount such that the $\gamma$-aminopropyltriethoxysilane/polyethylene layer will be about 0.05–0.25 $\mu$m thick when dry, the proportion of $\gamma$-aminopropyltriethoxysilane/polyethylene being approximately 5–30% based on the weight of the polyethylene; (2) drying the coating applied in step (1); (3) applying to the above dry coating a second coating of a copolymer of an $\alpha$-olefin having 3–10 carbon atoms and of an $\alpha,\beta$-unsaturated carboxylic acid having 3–8 carbon atoms, the mole proportion of the carboxylic acid being about 0.2–5% of the total monomers; and (4) heating the coating to a sufficiently high temperature to form a continuous film; the amount of the copolymer being such that the dry copolymer film is about 0.07–0.40 mm thick.

DETAILED DESCRIPTION OF THE INVENTION

Since the $\alpha$-olefin/carboxylic acid copolymer coatings on non-returnable glass containers are thin, they must not adhere too strongly to glass because they would be easily damaged by broken glass. They must be able to separate from glass on impact and stretch. On the other hand, if they are not bonded sufficiently, they may peel off the container in normal handling, thus providing no protection whatsoever. It has been found experimentally that the adhesion of the copolymer film to glass should be such that the peeling force required to delaminate a copolymer layer of 0.127 mm is within the range of about 1–2 kN/m when peeled at a nominal angle of 20° with respect to the bonded surface at a rate of 1 m/s.

The silane and the polyethylene may be applied simultaneously from a dispersion in a liquid, for example, from an aqueous emulsion. A convenient polyethylene concentration in the emulsion is about 1–2% by weight. The preferred weight proportion of the silane in the dispersion is about 0.075–0.15%. Alternatively, the silane can be applied to the glass first, either from an aqueous solution or from solution in an organic solvent, such as, for example, isopropyl alcohol, and the polyethylene is applied next. Application of these materials in reverse order would not achieve the purposes of the present invention because $\gamma$-aminopropyltriethoxysilane would not be able to bond to glass due to lack of direct contact. When application of $\gamma$-aminopropyltriethoxysilane and polyethylene is carried out in one step, the silane is believed to orient itself so as to form an intermediate, very thin layer, which is bonded both to the glass and to the polyethylene. Surprisingly, γ-aminoethyltriethoxysilane is the only commercially available silane that gives reproducible and satisfactory results. The usual glass factory organic coating does not have to be removed prior to this treatment, if it is water-dispersible; for example, polyoxyethylene stearate. Non-dispersible coatings such as polyethylene must first be removed from the glass surface because they would interfere with wetting of the glass surface. However, these usual coatings can be dispensed with altogether.

γ-Aminopropyltriethoxysilane is commercially available from Union Carbide Corporation under its trade designation A-1100. Polyethylene of the appropriate molecular weight can be obtained from several sources, including Allied Chemical Corporation (trade designation AC-629) and Eastman Kodak Company (trade designation Epolene® E-14). While these manufacturers do not specify whether the molecular weights of these products are number average or weight average, it is believed that the usual techniques employed within this low molecular weight range give the number average molecular weights. However, the difference between the number average and the weight average molecular weight within this range is expected to be quite small. It is preferred that the molecular weight distribution be such that lower molecular weight polymer predominates over higher molecular weight polymer. The commercial low molecular weight polyethylene often is sold as a partially oxidized material. This type is exceptionally suitable for the present purpose because it is well dispersible in water. Certain commercial dispersions of polyethylene in water also are satisfactory for this application.

The copolymer of an α-olefin with an α,β-unsaturated carboxylic acid can optionally be a terpolymer with a monoethylenically unsaturated third monomer. The concentration of the α-olefin-derived portion of the copolymer in the terpolymer is at least 70 mole %, preferably 80 mole %, of the total monomers. The concentration of the optional third monomer is about 0.2–25 mole %, preferably 1–10 mole %.

Suitable α-olefins includes ethylene, propylene, butene-1, pentene-1, hexene-1, heptene-1, 3-methylbutene-1, 4-methylpentene-1, etc. The preferred α-olefin is ethylene. Although polymers of higher α-olefins can be employed in the present invention, they are not readily available. The term "α-olefin" for the purpose of the present invention also includes two or more α-olefins. Examples of α,β-ethylenically unsaturated carboxylic acids are acrylic acid, methacrylic acid, ethacrylic acid, itaconic acid, maleic acid, fumaric acid; monoesters of said dicarboxylic acids, such as methyl hydrogen maleate, methyl hydrogen fumarate, and ethyl hydrogen fumarate; and maleic anhydride. Maleic anhydride can be considered an acid for the purposes of the present invention because of its chemical reactivity similar to that of an acid. Similarly, other α,β-monoethylenically unsaturated anhydrides of carboxylic acids can be employed. The preferred unsaturated carboxylic acids are methacrylic and acrylic acids.

Representative copolymers include the following: ethylene/acrylic acid copolymers, ethylene/methacrylic acid copolymers, ethylene/itaconic acid copolymers, ethylene/methyl hydrogen maleate copolymers, ethylene/maleic acid copolymers; ethylene/acrylic acid/methyl methacrylate copolymers; ethylene/methacrylic acid/ethyl acrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, and ethylene/chlorotrifluoroethylene/methacrylic acid copolymers.

The particularly preferred third monomer is a member of the class of the alkyl esters of α,β-ethylenically unsaturated carboxylic acids of 3 to 8 carbon atoms where the alkyl radical has 4 to 18 carbon atoms. The particularly preferred terpolymers are obtained from the copolymerization of ethylene, methacrylic acid and alkyl esters of methacrylic and/or acrylic acid with all isomeric butyl alcohols. Representative esters of α,β-unsaturated carboxylic acids include the n-butyl, isobutyl, sec-butyl, t-butyl, n-pentyl, isopentyl, n-hexyl, 2-ethylhexyl, and n-octadecyl esters of acrylic, methacrylic, and ethacrylic acids as well as mono- and diesters of maleic and fumaric acids.

The copolymer may be crosslinked by metal ions to any desired degree or uncrosslinked. Such crosslinked copolymer usually is referred to as an ionomer. It may, after polymerization, but prior to any ionic crosslinking, be further modified by various reactions which do not interfere with the ionic crosslinking. Halogenation of a copolymer of an α-olefin with an α,β-unsaturated carboxylic acid is an example of such polymer modification. The preferred copolymers, however, are those obtained by the direct copolymerization of ethylene with an α,β-unsaturated monocarboxylic acid. A typical copolymer suitable in the process of the present invention contain about 89 weight % ethylene and 11 weight % methacrylic acid.

Metal ions which are suitable in forming the ionomers that can be employed in the present invention can be divided into two categories: uncomplexed metal ions and complexed metal ions. In the uncomplexed metal ions the valence of the ion corresponds to the valence of the metal. These metal ions are obtained from the commonly known and used metal salts. The complexed metal ions are those in which the metal is bonded to more than one type of groups, at least one of which is ionized and at least one of which is not. Since the formation of the ionomers requires only one ionized valence state, it will be apparent that such complexed metal ions are equally well suited in the present invention. The term "metal ion having one or more ionized valence states" means a metal ion having the general formula $Me^{+n}X_m$, where n is the ionic charge and is at least one; X is a nonionized group; and n+m equal the valence of the metal. The utility of complexed metal ions employed in the formation of ionomers corresponds in their ionized valences to those of the uncomplexed metal ions. The monovalent metals are, of course, excluded from the class of complexed metal ions but higher-valent metals may be included depending on how many metal valences are complexed and how many can be ionized. The preferred metal ions are those in which all but one metal valences are complexed and one is readily ionized. Such compounds are in particular the mixed salts of very weak acids, such as oleic and stearic acid, with ionizable acids, such as formic and acetic acid.

The uncomplexed metal ions which are suitable in forming the ionomers from copolymers of α-olefins with α,β-unsaturated monocarboxylic acids, therefore, comprise mono-, di-, and trivalent ions of metals in Groups I, II, III, IV-A and VIII of the Periodic Table of Elements (see page 392, Handbook of Chemistry and Physics, Chemical Rubber Publishing Co., 37th ed.). Uncomplexed monovalent metal ions of the metals in the stated groups are also suitable in forming the ionomers from copolymers of α-olefins with ethylenically unsaturated dicarboxylic acids. Suitable monovalent metal ions are $Na^+$, $K^+$, $Li^+$, $Cs^+$, $Ag^+$, $Hg^+$ and $Cu^+$. Suitable divalent metal ions are $Be^{+2}$, $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$ and $Zn^{+2}$. Suitable trivalent metal ions are $Al^{+3}$, $Sc^{+3}$, $Fe^{+3}$ and $Y^{+3}$.

The preferred metal ions, regardless of the nature of the copolymer are $Na^+$ and $Zn^{+2}$. These metals are preferred because they result in ionic copolymers having the best combination of copolymer solid state properties with retention of melt fabricability. It is not essential that only one metal ion be employed in the formation of the ionomers, and more than one metal ion may be preferred in certain applications.

Ionomers of the type described above are well known in the art and are available from E. I. du Pont de Nemours and Company under the trademark Surlyn ®.

While nonionomeric copolymers (those not cross-linked by metal ions) are operable in the process of the present invention, it usually will be more advantageous to use ionomers, especially those in which at least 10% of the carboxylic groups are ionized, because films of such polymers have better physical properties.

This invention is now illustrated by representative examples of certain preferred embodiments thereof, wherein all parts, proportions, and percentages are by weight unless otherwise stated.

PEEL FORCE DETERMINATION

The apparatus for measuring the peel force was designed to approximate the conditions of separation of copolymer coatings during a bottle fracture. This permitted correlation of peel force (at a nominal angle of 20° and speed of 1 m/s) with glass retention when bottles are broken.

The apparatus comprises a sample holder which can be adjusted to provide the desired nominal peel angle, the sample holder being mounted on a strong but lightweight carriage which moves freely in the direction normal to the direction of peeling. Low friction and freedom of motion are provided by ball bearing bushings mounted on smooth rods. The copolymer film is partially stripped from the glass substrate, which is mounted at the desired angle. The free end of the film is clamped to a Kistler ® load cell (supplied by Sundstraned Data Control Co.) mounted in a carriage which is pulled vertically by a constant speed motor.

The peel force is measured by the output of the load cell which is recorded in a transient recorder and finally plotted by output transfer from the transient recorder to an X—Y recorder.

The actual peel angle is slightly less than the nominal value since a component of the peel force is required to transport the sample carriage.

In the following examples, peel force data are normalized to copolymer film having a thickness of 0.127 mm.

EXAMPLE 1

Titanium oxide-treated, clean borosilicate glass was coated with a very thin film of low M.W. polyethylene from a dispersion prepared according to the teachings of U.S. Pat. No. 2,995,533 to Parmer et al., containing 5% of γ-amino-propyltriethoxysilane based on the polyethylene.

Coating was accomplished by withdrawing the glass at the rate of 1.0 mm/s from a 2% dispersion of polyethylene in water containing 0.1% silane. The slide was air dried then baked 10 min. at 150° C.

A powdered copolymer of 89% polyethylene and 11% methacrylic acid, neutralized with sodium ions to the extent of 36% of carboxylic groups was applied to the silane/polyethylene-coated glass and rolled on the surface to a thickness of 0.25 mm using a roller with a 0.5 mm clearance. The powder coating was heated to 220° C. to form a tough, adherent ionomer film.

The samples were evaluated after equilibrating at the desired relative humidity for 1 to 2 weeks by peeling as described above. Data were obtained at 23%, 50%, and 81% R.H. Results are shown in Table I.

Table I

| | Peel Force (kN/m) | | |
|---|---|---|---|
| | 23% R.H. | 50% R.H. | 81% R.H. |
| Ionomer film on uncoated glass | 2.52 | 2.32 | 0.74 |
| Ionomer film on thin polyethylene coating | 1.21 | 1.08 | 0.63 |
| Ionomer film on thin polyethylene coating containing 5% silane | 1.58 | 1.30 | 1.23 |

It can be seen from the above results that in the absence of pretreatment, the ionomer film is bonded to glass too strongly at 23 or 50% R.H. but not strongly enough at 81% R.H. When pretreatment of the type described in U.S. 3,992,450 is first given, the peel force at 23 and 50% R.H. is within the desired limits but falls off sharply below the desired minimum at 81% R.H. The treatment of the present invention provides the right level of bond strength at all three R.H. levels.

EXAMPLE 2

Glass slides (borosilicate) were coated with a thin adsorbed layer of γ-aminopropyltriethoxysilane by immersing 15 minutes in a 0.2% solution in isopropyl alcohol/water (90/10 v./v.), withdrawing and rinsing with distilled water. The slides with the adsorbed silane were air dried, then baked 30 minutes at 150° C.

A thin coating of low molecular weight polyethylene was then applied from a commercial dispersion, Valspex ® 155-53 (Valchem Chemical Division of United Merchants and Manufactures, Inc.) by withdrawing from a 4% solids aqueous dispersion of polyethylene at 2 mm/second. The coated slides were baked 10 minutes at 150° C.

Copolymer coatings were applied using the same copolymer and technique as in Example 1, and tested at 50% and 81% R.H. Results are shown in Table II.

Table II

| Peel Force (kN/m) | |
|---|---|
| 50% R.H. | 81% R.H. |
| 1.56 | 1.38 |

This example shows that satisfactory results are obtained when γ-aminotriethoxysilane is applied to glass in a separate step, prior to the application of polyethylene.

EXAMPLE 3

Samples were prepared as described in Example 1 in which a copolymer of 89% ethylene and 11% methacrylic acid was used. One sample was non-ionomeric (not neutralized); two were neutralized with sodium and one with zinc ions. Results of peel tests are shown in Table III.

Table III

| Sample | | Peel Force (kN/m) | |
|---|---|---|---|
| Cation | % Neutralization | 50% R.H. | 81% R.H. |
| — | 0 | 1.63 | 1.87 |
| Na | 20 | 1.82 | 2.00 |
| Na | 43 | 1.66 | 1.82 |
| Zn | 10 | 1.96 | 2.08 |

The above data show that satisfactory results are obtained for both a non-ionomer and various types of ionomers.

EXAMPLE 4

The influence of glass surface treatments was established using untreated borosilicate glass, tin oxide-treated glass, and titanium oxide-treated glass. Samples were prepared using the copolymer and technique of Example 1. Results are given in Table IV.

Table IV

| Glass Treatment | Primary Coating | Peel Force (kN/m) | |
|---|---|---|---|
| | | 50% R.H. | 81% R.H. |
| None | None | 2.85 | 0.95 |
| None | Polyethylene* | 1.22 | 0.97 |
| None | Polyethylene*/silane | 1.58 | 1.63 |
| Tin oxide | None | 2.42 | 0.84 |
| Tin oxide | Polyethylene* | 1.27 | 0.72 |
| Tin oxide | Polyethylene*/silane | 1.40 | 1.47 |
| Titanium oxide | None | 2.61 | 0.75 |
| Titanium oxide | Polyethylene* | 1.51 | 0.71 |
| Titanium oxide | Polyethylene*/silane | 1.78 | 1.68 |

*a 2% aqueous dispersion of AC-629 (Allied Chemical Corp.).

It can be seen from the above results that satisfactory results are obtained using a primary coating of γ-aminopropyltriethoxysilane and polyethylene, whether the glass surface is untreated or coated with titanium oxide or tin oxide.

It was further found that at 100% R.H. all the copolymer films applied over γ-aminopropyltriethoxysilane/-polyethylene coatings remained bonded to the glass, while the films applied to untreated or polyethylene-coated glass separated from the glass.

I claim:

1. A process for applying to glass a coating capable of delamination and stretching upon impact resulting in glass breakage, said process comprising:
   (1) applying to a glass surface free from materials which are non-dispersible in water a two-component coating which contains as one component γ-aminopropyltriethoxysilane that bonds directly to the glass, and as the other component polyethylene having an average molecular weight within the range of approximately 1000 to 2000 in an amount such that the γ-aminopropyltriethoxysilane/-polyethylene layer will be about 0.05–0.25 μm thick when dry, the proportion of γ-aminopropyltriethoxysilane being approximately 5–30% based on the weight of the polyethylene;
   (2) drying the coating applied in step (1);
   (3) applying to the above dry coating a second coating of a copolymer of an α-olefin having 3–10 carbon atoms and of an α,β-unsaturated carboxylic acid having 3–8 carbon atoms, the mole proportion of the carboxylic acid being about 0.2–5% of the total monomers; and
   (4) heating the coating to a sufficiently high temperature to form a continuous film; the amount of the copolymer being such that the dry copolymer film is about 0.07–0.40 mm thick.

2. The process of claim 1 wherein γ-aminopropyltriethoxysilane and polyethylene are applied simultaneously from an aqueous dispersion.

3. The process of claim 1 wherein γ-aminopropyltriethoxysilane is applied to the glass surface before the polyethylene.

4. The process of claim 1 wherein the polyethylene is partially oxidized.

5. The process of claim 1 wherein the copolymer of an α-olefin with an α,β-unsaturated carboxylic acid is a terpolymer with a monoethylenically unsaturated third monomer, the concentration of the α-olefin-derived portion of the copolymer being at least 70 mole %, and the concentration of the third monomer being about 0.2–25 mole %.

6. The process of claim 5 wherein the concentration of the α-olefin-derived portion of the copolymer is at least 80 mole %, and the concentration of the third monomer is 1–10 mole %.

7. The process of claim 6 wherein the third monomer is a $C_4$–$C_{18}$ alkyl ester of an α,β-unsaturated $C_3$–$C_8$ carboxylic acid.

8. The process of claim 7 wherein the alkyl group is a butyl group.

9. The process of claim 1 wherein the copolymer is a dipolymer of ethylene with an α,β-unsaturated carboxylic acid.

10. The process of claim 9 wherein the α,β-unsaturated carboxylic acid is methacrylic acid.

11. The process of claim 1 wherein the copolymer is a copolymer of ethylene, propylene, and an α,β-unsaturated carboxylic acid.

12. The process of claim 1 wherein the copolymer is at least partly in ionized form.

* * * * *